United States Patent [19]

Lauwers

[11] Patent Number: 5,116,399
[45] Date of Patent: May 26, 1992

[54] GLASS MELTER WITH FRONT-WALL OXYGEN-FIRED BURNER PROCESS

[75] Inventor: Eddy J. Lauwers, Kalmthout, Belgium

[73] Assignee: Union Carbide Industrials Gases Technology Corporation, Danbury, Conn.

[21] Appl. No.: 684,028

[22] Filed: Apr. 11, 1991

[51] Int. Cl.$^5$ .................................................. C03B 5/16
[52] U.S. Cl. ........................................ 65/135; 65/337; 65/347
[58] Field of Search .................. 65/134–136, 65/347, 337, 338

[56] References Cited

U.S. PATENT DOCUMENTS

| | | | |
|---|---|---|---|
| 3,592,623 | 7/1971 | Shepard | 65/136 |
| 4,062,667 | 12/1977 | Hatanaka et al. | 65/135 |
| 4,473,388 | 9/1984 | Lauwers | 65/134 |
| 4,599,100 | 7/1986 | Demarest | 65/134 |
| 4,816,056 | 3/1989 | Tsai, et al. | 65/135 |

Primary Examiner—Robert L. Lindsay
Attorney, Agent, or Firm—Chung K. Pak

[57] ABSTRACT

The invention relates to a process for melting glass forming ingredients in a glass melting furnace adapted therefore, said furnace having an upstream melting zone and a downstream fining zone, wherein the glass forming ingredients introduced to the upstream melting zone via inlet means and the resulting melt therefrom travel along a path from the melting zone to the fining zone, said melt being withdrawn from outlet means which communicate with the fining zone, the improvement comprising; providing at least one high momentum oxygen-fired flame in the vicinity of said outlet means to sweep unmelted glass forming ingredients floating on the surface of the melt in said vicinity to prevent said unmelted glass forming ingredients from entering the outlet means whereby the contamination of an outflowing molten glass from said outlet means is avoided or reduced.

13 Claims, 2 Drawing Sheets

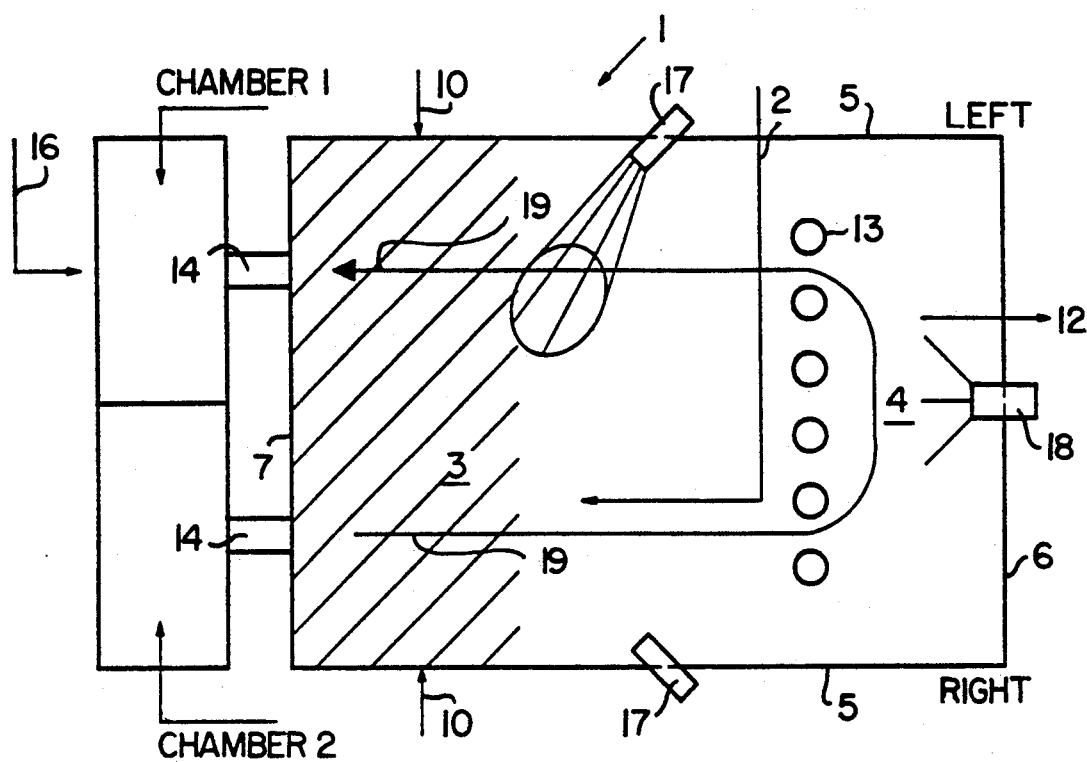
F I G. 1
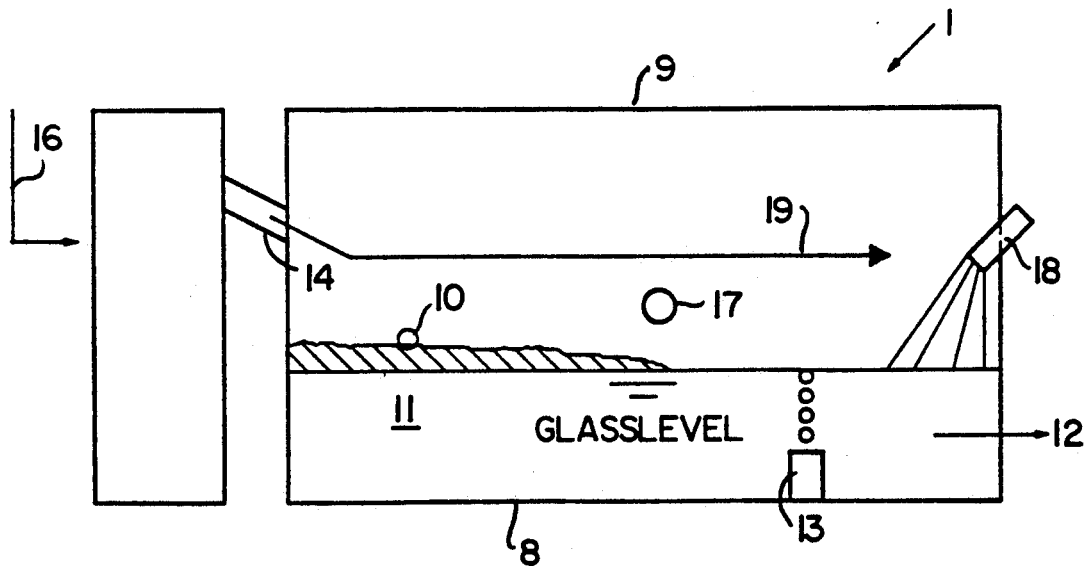
F I G. 2

GLASS MELTER WITH FRONT-WALL OXYGEN-FIRED BURNER PROCESS

TECHNICAL FIELD

The invention relates to a glass melting process and a glass melting furnace adapted therefor, wherein at least one oxygen/fuel auxiliary burner is installed in an appropriate place within the furnace to prevent glass forming ingredients from entering the furnace outlet means such as the furnace throat.

BACKGROUND OF THE INVENTION

In the manufacture of glass, glass forming ingredients are usually melted and refined in a glass melting furnace having a melting zone and a fining zone. The glass forming ingredients generally are heated by a plurality of air-fired burners oriented within the furnace so as to provide heat to the ingredients and to the resulting melt, which flow from the melting zone to the fining zone. A pool of the molten glass or melt is always maintained to operate the melting process in a continuous manner. When a certain amount of the melt is discharged from the furnace through outlet means, a certain amount of the glass forming ingredients is added to replenish the furnace with the melt. Unmelted, solid glass forming ingredients, having a lower specific gravity than the melt, float on the surface of the melt. As the melt is discharged through the furnace throat or other outlet means, the solid glass forming ingredients near the furnace throat area can descend from the surface of the melt to enter the furnace throat, thereby exiting with the melt. The presence of these unmolten glass crystals in the discharged melt adversely affects the quality of a glass product which may be bottles, fibers or other products.

The prior art has addressed this problem in various ways. U.S. Pat. No. 4,816,056 (Tsai et al) issued on Mar. 28, 1989, discloses impinging a transversely extending curtain of flames onto the surface of the molten glass in an area between the discharging end and the entrance end with sufficient force to influence the surface to direct the unmelted, solid glass forming ingredients away from the discharging end. The flames may be supplied by oxy-fuel burners and can be impinged at an angle of 5° to 20°.

U.S. Pat. No. 4,473,388 (Lauwers) issued Sep. 25, 1984 discloses melting unmelted glass forming ingredients in the melting zone by directing the tips of oxy-fuel flames at the interface of the solid glass forming ingredients and the molten glass. This flame barrier melts a substantial amount of the glass forming ingredients. However, some solid, glass forming ingredients escape from this barrier.

U.S. Pat. No. 3,592,623 (Shepherd) issued Jul. 13, 1971, discloses circulating unmelted glass forming ingredients in whirlpool fashion at the entrance end of the melting zone, thereby preventing the movement of the ingredients toward the firing zone. This whirlpool like circulation is accomplished by directing the flames of oxygen-fuel burners toward a hot spot. The term "hot spot" refers to a location in the furnace where the temperature of the roof is maximum (about 1580/C). At both ends of the furnace, the roof temperature is lower, (the entrance end about 1350° C. and the outlet end about 1480° C.). This "hot spot" location normally corresponds to an area where the surface covered by solid floating glass forming ingredients (melting area) changes into a surface almost free from the floating glass forming ingredients (refining area).

SUMMARY OF THE INVENTION

The present invention relates to a process for melting glass forming ingredients in a glass melting furnace adapted therefor, said furnace having an upstream melting zone and a downstream fining zone, wherein the glass forming ingredients introduced to the upstream melting zone via inlet means and the resulting melt therefrom travel along a path from the melting zone to the fining zone, said melt being withdrawn from outlet means which communicate with the fining zone, the improvement comprising, providing at least one high momentum oxygen-fired flame in the vicinity of said outlet means to sweep unmelted glass forming ingredients floating on the surface of the melt in said vicinity to prevent said unmelted glass forming ingredients from entering the outlet means whereby the contamination of an outflowing molten glass from said outlet means is avoided or reduced.

The high momentum oxygen-fired flame in the vicinity of the furnace outlet is preferably provided by an aspirating burner such as is disclosed and claimed in U.S. Pat. No. 4,541,796 —Anderson placed in the front-wall above the furnace outlet means. This aspirating burner produces a high momentum, small sized flame in a length of about 0.5 to about 1.5 meters. The primary function of the aspirating burner is to sweep unmelted glass forming ingredients in the vicinity of the furnace outlet means. In addition to the primary function of physically sweeping unmelted glass forming ingredients, the aspirating burner also melts some unmelted glass forming ingredients. When it is properly placed in the vicinity of the outlet means, it may cause turbulence on the melt surface to facilitate heat transfer from the melt to the unmelted glass forming ingredients. To achieve these purposes, it is placed in such an angle to impinge its flame on the surface of the molten glass at about 0.5 to about 2.0 meters from the front-wall of the furnace, more preferably at about 0.75 to about 1.5 meters from the front-wall of the furnace. As a result of this flame from the aspirating burner, the vicinity of the outlet means over a distance of about 2.5 meters into the interior of the furnace from the front-wall, is free from any unmelted, solid glass forming ingredients.

Additionally, at least one lower momentum oxygen/fuel auxiliary burner may be placed in each wall of the furnace to facilitate the melting of glass forming ingredients in the furnace. This lower momentum oxygen/fuel burner produces a flame which will not dust away the unmolten solid glass. The lower momentum burner can produce a flame length of about 0.4 to about 4 meters, depending on the furnace size. The position of the lower momentum burner in the furnace is preferably such that its flame is directed to the interface of the solid glass forming ingredients and the molten glass in the furnace.

Various conventional glass melting furnaces, particularly large sized recuperative or regenerative furnaces, may be employed.

The present invention provides an improvement in increasing the pull rate (the rate at which the melt moves through the furnace), without reducing the quality of a glass product. This improvement is achieved in spite of the fact that an increased pull rate is known to have a deleterious effect on the resulting glass product due to a great tendency for solid, unmelted glass forming ingredients to exit the furnace with the melt.

BRIEF DESCRIPTION OF THE DRAWINGS

FIGS. 1 2, 3 and 4 are schematic views of glass melting furnaces having oxygen/fuel burners positioned in accordance with one embodiment of the present invention.

FIGS. 1 and 2 are top and side views of a U-type flame, end fired regenerative furnace.

FIGS. 3 and 4 are top and side views of a cross-fired regenerative furnace.

DETAILED DESCRIPTION OF THE INVENTION

Figure 3:
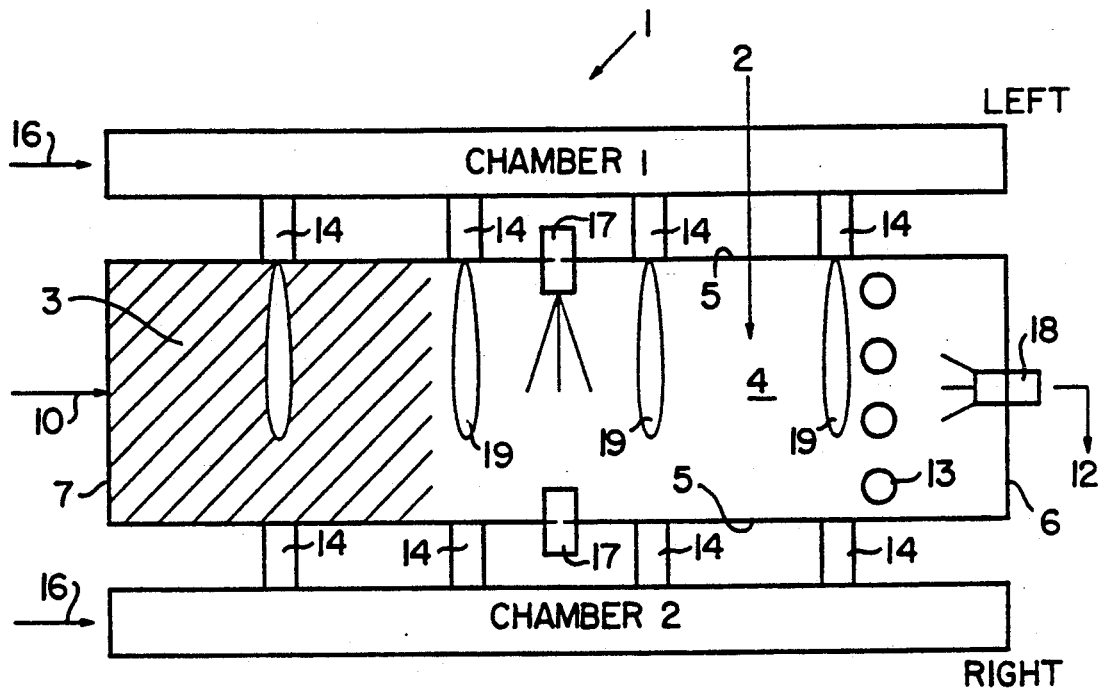

FIGS. 1, 2, 3 and 4 illustrate top and side cross-sectional views of a regenerative glass furnace (1). The furnace comprises an elongated chamber (2) having a melting zone (3) and a fining zone (4) which is formed by side walls (5), front wall (6) back wall (7) and bottom and roof structures (8 and 9 respectively). Due to the high temperatures involved in melting and refining glass, a suitable refractory material is generally used to install walls and roof and bottom structures of the furnace (1). The suitable refractory material includes, inter alia, alumina, chrome-magnestie, magnesia and silica.

Glass forming ingredients are introduced to the melting zone (3) of the chamber (2) through inlet means (10). The glass forming ingredients form a layer of solid particles on the surface of the molten glass (11) in the melting zone (3). The layer of solid particles proceeds to melt gradually as it travels from the melting zone (3) to the fining zone (4). The solid particles float on the surface of the molten glass toward the front wall (6) where outlet means (12) is located, after passing an eventual installed air barrier (air bubbler (13)) located in the fining zone (4), some meters away from the front wall (6).

The glass forming ingredients are a mixture of high temperature melting raw materials used in the manufacture of glass. The mixture make-up is dependent on the type of glass being produced. Normally, the mixture comprises, inter alia, silica containing materials including scrap glass referred to as cullet. Other glass forming materials including feldspar, limestone, dolomite, soda ash, potash, borax and alumina may also be used. To alter the properties of the glass, a minor amount of arsenic, antimony, sulfates and/or fluorides needs to be added. Moreover, color forming metal oxides can be added to obtain the desired color.

The heat necessary to melt the glass forming ingredients and to maintain the molten glass at a desired temperature is primarily provided by air-fired burners (14). The air-fired burners (14) are designed to burn a suitable liquid fuel, such as oil, or a fuel gas, such as natural gas or LPG. The type of fuel used is generally dependent on the commercial availability of the fuel, the economy of the fuel and the suitability of the fuel in glass melting. The hot effluent gas resulting from this combustion is withdrawn through a regenerator (16) having at least two chambers. The heat from the discharged effluent gas is captured and conserved via these regenerators and is used to heat air before it proceeds to the air-fired burners.

Preferably on each side wall (5), at least one low momentum oxygen-fired oxygen/fuel auxiliary burner (17) is positioned to further facilitate the melting capacity of the furnace. By "low momentum" it is meant a flame which velocity at the burner tip does not exceed 100 m/sec, while "high momentum" means a flame which velocity at the burner tip exceeds 100 m/sec. The preferred low momentum flame is produced with the fuel and oxidant having velocities of about 50 to 80 meter/sec, whereas the preferred high momentum flame is produced with the fuel having a velocity of about 100 meter/sec and the oxidant having a velocity of about 200 meter/sec. Basically, the difference in low and high momentum flames is in the outlet velocities of the fuel and oxidant. By "oxygen-fired" it is meant a burner which uses an oxidant having an oxygen concentration of at least 50 percent, and preferably which exceeds 75 percent.

The flame tips of the low momentum oxygen-fired burners (17) are preferably directed to a point located at about ¼ of the furnace width taken from the side wall (5) with one further requirement, i.e., that the point be at the interface of the solid particulate layer and the melt. It will be understood that the flame tips do not have to be precisely on target and can vary from the point by as much as several meters. The closer the flame tips are to the point the better, however. The high temperature of the flame melts the solids in its path and exposes the interface. An upstream angle is applied to be certain the flame tip and the interface coincide. The flame length is regulated so that the tip strikes the target, but is not deflected off the solids/melt surface against the walls of the furnace as this would accelerate refractory wear. The flame covers substantially the surface in a narrow band about 0.4 to about 1 meter wide and has an angle with the center line as to avoid disturbance of the air flame by the oxygen flame.

This flame barrier, by melting substantially all of the solids in the narrow band, provides a demarcation between the melting zone and the fining zone through which very little solids escape.

The low momentum burners (17) placed on the sidewalls (5) fire the flames alternatively following the firing sequence of the air/fuel burners (14). When the air-fired burners (14) on the right of the furnace fire the flames (19) towards the chamber (1), at least one low momentum burner (17) on the opposite side fires its flame. During this period of air- firing, the left air burner (14) and the right oxy-burner (17) are shut down. At the change of the firing sequence, all firing is reversed. This firing sequence technique prevents the oxygen/fuel flame from disturbing the flames from the air- fired burners. Disturbance of the air/fuel flames is believed to cause a less efficient fuel usage of the air flames.

On the front-wall (6) above the outlet means (12), at least one high momentum oxygen-fired burner (18) is mounted. The primary function of the high momentum burner (18) is to sweep the unmelted glass forming ingredients floating on the surface of the molten glass (11) in the vicinity of the outlet means (12), thereby preventing the ingredients from entering the outlet means (12). The high momentum burner (18) is located about 1.5 meter to about 2 meter above the solid/melt surface with an angle which is within the range of about 10° to about 90°, preferably about 20° to about 45°, as measured downward from the central axis of the burner (18). The angle of the high momentum burner (18) is such that the interaction of its flame and the main burner fired from the opposite end must be minimized. The flame of the high momentum burner (18), which is directed essentially toward the backwall (7), impinges on the surface of the molten glass (melt) at about 1 to about 1.5 meter from the front-wall (6). As a result of this oxygen flame from the high momentum burner (18), the vicinity of the outlet means (12), which extends up to about 2.5 meter, into the interior of the furnace (1) from the front-wall (6), is free from any unmelted solid glass forming ingredients.

Oxygen/fuel burners, more commonly referred to as oxy-fuel burners, are well known. They are designed to use a higher percentage of oxygen than is present in air and thus provide much higher flame temperatures. The temperature of the flame imparted by the oxygen-fuel auxiliary burner is dependent on the quality of the fuel and the oxygen/fuel ratio. Generally, this temperature of the oxygen flame is about 2780° C., which is substantially higher than the temperature of a conventional air-fuel burner which is about 1950° C. Generally, the oxygen in the oxidant is at a level of about 50 percent to 100 percent by volume. It will be understood that the term "oxidant" contemplates the presence of other gases such as nitrogen or argon in admixture with the oxygen. These other gases may be present in amounts of about 0 percent to about 50 percent.

A preferred oxy-fuel burner for use in the process is an assembly of three concentric cylinders:
(i) the outer cylinder is a jacket, through which any cooling medium flows for protection of the burner from being overheated by the furnace atmosphere;
(ii) the middle cylinder is an oxygen or oxygen containing gas supply line; and
(iii) the inner or center cylinder is a supply line for a gaseous or liquid fuel.

The burner assembly is of sufficient length to protrude through the furnace wall or may be contained in a burner block mounted on the furnace wall so that the burner parts are not affected by the furnace atmosphere. Connections are foreseen for several fluids passing through the burner, i.e., the water for the waterjacket, the gaseous or liquid fuel, and the oxygen containing gas.

There is a frontplate, which covers the end of the burner assembly. It has one large cylindrical orifice in the center, which orifice permits gaseous or liquid fuel to flow from the center cylinder, surrounded by a number of small cylindrical orifices equidistant from each other and from the axis (running from end to end) of the center cylinder. These orifices open into the middle cylinder. Each of the axes (again, running from end to end of the cylinder) of these smaller cylindrical orifices is slanted at an angle from the axis of the center cylinder so that the oxygen containing gas passes downward from the middle cylinder in the direction of the axis of the center cylinder to meet the fuel proceeding parallel to the axis of the center cylinder. The overall burner assembly is about 1.5 meter in length and the diameter of the outer cylinder is about 110 millimeter. The thickness of the frontplate is about 12 millimeter, the large orifice is about 20 millimeter in diameter, and the smaller orifices are about 8 millimeter in diameter.

The orifices in the frontplate of the burner create a homogeneous mixture of fuel and oxygen thus obtaining a high temperature flame. By varying the diameter and length of the frontplate orifices and the angle of the axes of the smaller orifices to that of the axis of the large center orifice different flame lengths, accommodating different furnace dimensions, are obtained. Further, the frontplate permits the fuel to burn with more or less oxygen than required for complete combustion. Consequently, if it is desired for reasons of glass quality, a reducing or oxidizing flow may be obtained without affecting the shape of the flame.

The glass melting furnace (1) is a large sized furnace with a production capacity over 200 TPD (tons per day). These furnaces have cross-sectional widths of more than 4 meters. It has been found in those large sized furnaces that the solid, glass forming ingredients floating on the surface of the melt has a tendency to arrive at the front-wall (6) of the furnace and descend from the surface of the melt to enter the furnace outlet.

Figure 4:
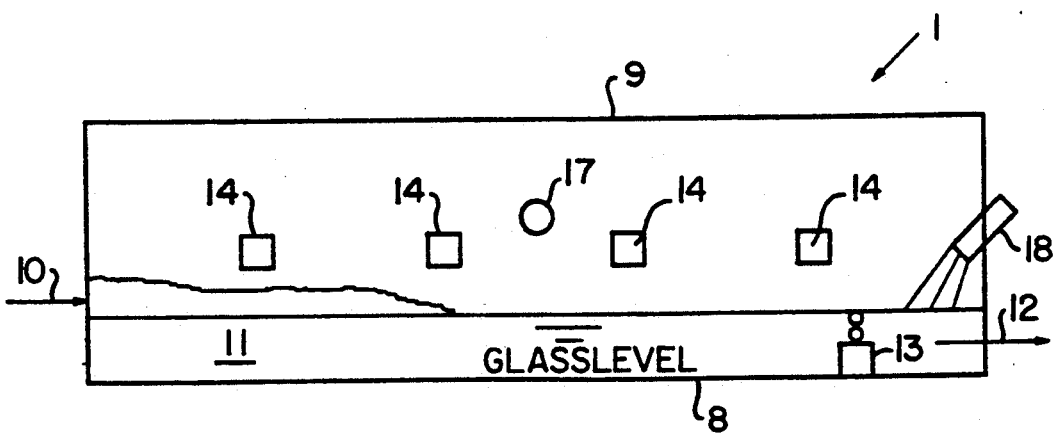

As in FIGS. 1 and 2, same practice can be applied with oxy-burner in regenerative cross-fired furnaces (see FIGS. 3 and 4).

The difference between the two types of regenerative furnaces is the location of the regenerators (16).

In a cross-fired regenerative furnace, those are located parallel to the side walls (5), unlike at the end-fired furnace where they are located at the back wall (7).

In the cross-fired regenerative case, the oxy-burners (17) and (18) remain in the same position as in the end-fired furnace of FIG. 1. In the firing sequence, unlike to the case of FIG. 1, the air burners (14) and oxy-burner (17) fire together in the same direction, while the burners at the opposite side are shut down.

The following example serves to further illustrate the invention. It is presented for illustrative purposes and it is not intended to be limiting.

EXAMPLE

The large end-fired regenerative furnace, produced 207 TPD molten glass without lithium flux and 218 TPD molten glass with lithium flux. To that furnace, one high momentum oxygen- fired auxiliary burner was placed on the front-wall above the furnace outlet. The high momentum burner was placed on the center of the front-wall about 1 meter away from the surface of the molten glass. A very sharp placement angle of about 41°, as measured downward from the central axis of the burner, was used to minimize the interaction of the high momentum burner flame with the main air burner flame which is fired from the opposite end. The primary function of the high momentum oxygen/fuel burner was to use its high momentum flame having a length of about 1.5 meter and a temperature of about 2780° C. to sweep and melt the solid glass forming ingredients floating on the surface of the molten glass in the vicinity of the furnace outlet.

Additionally, two low momentum oxygen-fired burners were installed on the side walls of the furnace. Each low momentum burner was placed on each side wall, facing one another. The burner was placed on about 2.5 meter from the back-wall and about 1.2 meter from the surface of the molten glass. A placement angle of about 36°, as measured downward from the central axis of the burner, was used primarily to melt the glass forming ingredients on the surface of the melt. The low momentum oxy-burners produced low burner momentum flame having a temperature of about 2780° C. The firing sequence of these burners on the side walls correspond to the firing sequence of the air/fuel burners on the back wall. Only one low momentum oxy-burner fired from the left side wall when the air/fuel burners on the right side were firing. Once the furnace installed with these three burners as described above was in operation, a molten glass production rate increased to 257 MTPD, without lithium flux. The oxygen burners demonstrated 50 MTPD production rate increase or 24% without any adverse effect on the quality of the glass product. The further increase in the production rate, however, was limited by the capacities of the downstream equipment which used the molten glass.

The combination of two different oxygen-fired burners having high momentum and low momentum in the defined arrangement as set forth by the present invention is advantageous. This arrangement imparted a surprisingly high glass production rate, without adversely affecting the quality of a glass product.

In general a substantial (up to 25%) meltrate increase can be achieved by installing two oxy-burners in the side-wall of the glass furnace firing additionally to the air burners as described above. At larger furnace sizes (over 200 TPD), a part of the non-molten product can enter the outlet area and can cause product quality degredation.

The purpose of the 3rd front-wall is to avoid this unmolten Product breakthrough while conserving the effect (production increase) of the other side-wall oxy-burners which fire together with the air burners.

What is claimed is:

1. In a process for melting glass forming ingredients in a glass melting regenerative or recuperative furnace having a cross-sectional dimension (width) of at least 4 meters, said furnace having an upstream melting zone and a downstream fining zone, wherein the glass forming ingredients introduced to the upstream melting zone through inlet means and the resulting melt travel along a path from the melting zone to the fining zone, said melt being withdrawn from outlet means which communicate with the fining zone, the improvement comprising; providing at least one oxygen-fired flame having a velocity greater than about 100 m/sec at the tip of at least one auxiliary oxy-fuel burner wherein said at least one oxygen-fired flame is directed to impinge on the surface of the melt at about 0.5 to about 2 meters from the front wall of said furnace in a direction which is essentially toward the back wall of said furnace to sweep unmelted glass forming ingredients floating on the surface of the melt in the vicinity of such outlet means to prevent said unmelted glass forming ingredients from entering the outlet means whereby the contamination of said melt withdrawn from said outlet means is avoided or reduced.

2. A process according to claim 1, further comprising providing at least one additional oxygen-fired flame having a velocity less than 100 m/sec at the tip of at least one additional oxy-fuel burner to melt the glass forming ingredients, said at least one additional oxy-fuel burner being located on each side wall of said furnace.

3. A process according to claim 2, wherein said at least one oxygen-fired flame having a velocity of greater than about 100 m/sec is provided by said at least one auxiliary oxy-fuel burner placed on the front-wall above the outlet means.

4. A process according to claim 3, wherein said at least one auxiliary oxy-fuel burner is placed at about 0.5 to about 2 meters above the surface of the molten glass.

5. A process according to claim 3, wherein said at least one auxiliary oxy-fuel burner is located on the center of the front-wall.

6. A process according to claim 5, wherein a placement angle of said at least one auxiliary oxy-fuel burner is within the range of about 10° to 90°, as measured downward from the central axis of said at least one auxiliary oxy-fuel burner.

7. A process according to claim 6, wherein said placement angle is within the range of about 20° to about 45°, as measured from the central axis of said auxiliary oxy-fuel burner.

8. A process according to claim 2, wherein the tip of said at least one additional flame having a velocity of less than 100 m/sec is directed at the interface of the glass forming ingredients and the molten glass in the furnace.

9. A process according to claim 2, wherein the vicinity of the outlet means, which extends up to about 2.5 meters into the interior of the furnace from the front-wall, is free from any unmelted solid glass forming ingredients.

10. A process according to claim 2, wherein the furnace employed is a U-type flame, end-fired regenerative furnace.

11. A process according to claim 10, wherein a placement angle of said at least one auxiliary oxy-fuel burner is such that the interaction of its flame and the main air-burner flame of said U-type flame, end-fired regenerative furnace is minimized.

12. A process according to claim 2, wherein the furnace employed is a cross-fired regenerative furnace.

13. A process according to claim 12, wherein said at least one additional oxy-fuel burner on each side wall fires the flame alternately, following the firing sequence of air-fired burners in said cross-fired regenerative furnace.

* * * * *